United States Patent [19]

Nachtkamp et al.

[11] 4,303,774
[45] Dec. 1, 1981

[54] POLYURETHANES WHICH ARE DISPERSIBLE OR SOLUBLE IN WATER AND A PROCESS FOR THEIR PREPARATION

[75] Inventors: Klaus Nachtkamp, Bergisch Gladbach; Josef Pedain; Klaus Noll, both of Cologne, all of Fed. Rep. of Germany

[73] Assignee: Bayer Aktiengesellschaft, Leverkusen, Fed. Rep. of Germany

[21] Appl. No.: 30,600

[22] Filed: Apr. 16, 1979

[30] Foreign Application Priority Data

Apr. 18, 1978 [DE] Fed. Rep. of Germany ....... 2816815

[51] Int. Cl.³ .................... C08G 18/64; C08G 18/71; C08G 18/50; C08L 75/08
[52] U.S. Cl. ............................ 528/71; 260/29.2 TN; 260/453 AR; 260/513 R; 521/174; 528/904; 560/159
[58] Field of Search ............... 521/174; 260/453 AR, 260/29.2 TN; 528/71, 904

[56] References Cited

U.S. PATENT DOCUMENTS

| | | | |
|---|---|---|---|
| 3,479,310 | 11/1969 | Dieterich et al. | 260/29.2 TN |
| 3,756,992 | 9/1973 | Dieterich et al. | 260/77.5 Q |
| 3,905,929 | 9/1975 | Noll | 260/29.2 TN |
| 3,920,598 | 11/1975 | Reiff et al. | 260/29.2 TN |
| 3,959,329 | 5/1976 | Dieterich et al. | 260/453 AR |
| 4,092,286 | 5/1978 | Noll et al. | 260/29.2 TN |
| 4,108,814 | 8/1978 | Reiff et al. | 260/29.2 TN |
| 4,190,566 | 2/1980 | Noll et al. | 260/29.2 TN |
| 4,238,378 | 12/1980 | Markusch et al. | 260/29.2 TN |

FOREIGN PATENT DOCUMENTS

| | | |
|---|---|---|
| 2446440 | 4/1976 | Fed. Rep. of Germany . |
| 2551094 | 5/1977 | Fed. Rep. of Germany . |
| 1076688 | 7/1967 | United Kingdom . |

*Primary Examiner*—H. S. Cockeram
*Attorney, Agent, or Firm*—Gene Harsh; Lawrence S. Pope; Thomas W. Roy

[57] ABSTRACT

The present invention relates to water soluble or water dispersible polyurethane elastomers which have a substantially linear molecular structure and which contain both ethylene oxide units incorporated in polyether chains and sulphonate groups, characterized in that they contain from about 0.5 to 20% by weight of ethylene oxide units of the formula $-CH_2-CH_2-O-$ arranged within polyether chains and from about 0.1 to 25 milliequivalents, per 100 g of solid, of sulphonate groups of the formula $-SO_3^{\ominus}$ in the form of structural units of the formula $$-O-X-R$$

arranged in end positions and/or side positions, wherein
X represents a polyalkylene oxide chain having from 5 to 90 chain members, at least about 40% of which chain members constitute ethylene oxide units and
R represents a monovalent hydrocarbon group having from 3 to 18 carbon atoms containing at least one sulphonate group $-SO_3^{\ominus}$ and to a process for their production.

9 Claims, No Drawings

POLYURETHANES WHICH ARE DISPERSIBLE OR SOLUBLE IN WATER AND A PROCESS FOR THEIR PREPARATION

BACKGROUND OF THE INVENTION

Numerous processes for the preparation of polyurethanes which are soluble or dispersible in water are known and are described for example in U.S. Pat. Nos. 3,479,310; 3,756,992; 3,920,598; 3,905,929; 4,092,286 and 4,108,814; British Pat. No. 1,076,688 and German Offenlegungsschriften Nos. 2,446,440; 2,551,094 and 2,555,534. Further improvements to these known processes constitute the subject matter of German Patent Applications Nos. P 26 51 505 which corresponds to U.S. Pat. No. 4,238,378; P 26 51 506 which corresponds to U.S. Pat. No. 4,237,264; P 26 59 617 which corresponds to U.S. patent application Ser. No. 862,455, filed Dec. 20, 1977; P 27 21 985 which corresponds to U.S. Pat. No. 4,182,828; P 27 25 589 which corresponds to U.S. patent application Ser. No. 908,885, filed May 24, 1978; P 27 30 514; P 27 32 131 which corresponds to U.S. Pat. No. 4,192,937; and P 27 34 576 which corresponds to U.S. Pat. No. 4,240,942.

These processes known in the art relate both to the preparation of ionically modified polyurethanes as described for example in U.S. Pat. Nos. 3,479,310 and 3,756,992 and British Pat. No. 1,076,688, to the preparation of non-ionically, hydrophilically modified polyurethanes as described for example in U.S. Pat. Nos. 3,920,598 and 3,905,929 and to the preparation of polyurethanes containing ionic groups and non-ionic hydrophilic groups as described for example in U.S. Pat. No. 4,092,286 and German Offenlegungsschrift No. 2,551,094. These polyurethanes, in particular those described in the last mentioned Offenlegungsschrift and U.S. Pat. No. 4,092,286, have numerous important advantages. In spite of containing ionic groups, they are largely insensitive to electrolytes and have excellent frost-resistance. In addition, the authors of German Offenlegungsschrift No. 2,551,094 and U.S. Pat. No. 4,092,286 found that if the polyurethanes contained both ionic and non-ionic hydrophilic groups, a much smaller concentration of hydrophilic groups was sufficient to ensure their dispersibility than that required when ionic groups or non-ionic groups were incorporated alone.

The process according to the invention described below constitutes an improvement of the process according to German Offenlegungsschrift No. 2,551,094 and U.S. Pat. No. 4,092,286 in that hydrophilic starting components which contain both sulphonate groups and ethylene oxide units which are arranged within a polyether chain are used for the first time. In the process according to German Offenlegungsschrift No. 2,551,094 and U.S. Pat. No. 4,092,286, the introduction of these different hydrophilic groups still necessitated the simultaneous use of both starting components which contained ethylene oxide units and other starting components which contained ionic groups. Since both these hydrophilic starting components used according to German Offenlegungsschrift No. 2,551,094 and U.S. Pat. No. 4,092,286 consist not only of the aforesaid hydrophilic groups, but also of structural units which constitute a considerable proportion by weight and contribute nothing to the dispersibility of the polyurethane, it is necessary to incorporate a large quantity of hydrophilic starting components into the polyurethane in order to introduce the number of hydrophilic groups required to render it dispersible or soluble. This so-called "ballast" which is superfluous for the purpose of dispersibility and often has a deleterious effect on other properties of the polyurethanes is reduced to an absolute minimum in the process according to the invention described below since in this process both ionic groups (sulphonate groups) and non-ionic hydrophilic groups are incorporated by means of a single hydrophilic starting component which contains both centers.

SUMMARY OF THE INVENTION

The present invention relates to water soluble or water dispersible polyurethane elastomers which have a substantially linear molecular structure and which contain both ethylene oxide units incorporated in polyether chains and sulphonate groups, characterized in that they contain from about 0.5 to 20% by weight of ethylene oxide units of the formula —CH$_2$—CH$_2$—O— arranged within polyether chains and from about 0.1 to 25 milliequivalents, per 100 g of solid, of sulphonate groups of the formula —SO$_3^\ominus$ in the form of structural units of the formula

—O—X—R arranged in end positions and/or side positions, wherein
  X represents a polyalkylene oxide chain having from 5 to 90 chain members, at least about 40% of which chain members constitute ethylene oxide units and
  R represents a monovalent hydrocarbon group having from 3 to 18 carbon atoms containing at least one sulphonate group —SO$_3^\ominus$.

The present invention also relates to a process for the preparation of water soluble or dispersible polyurethanes by the reaction of organic diisocyanates with organic compounds having molecular weights of from about 300 to 6000 which contain isocyanate-reactive hydrogen atoms in end positions and are difunctional in isocyanate polyaddition reactions and/or low molecular weight compounds, with molecular weights below about 300, having at least two isocyanate-reactive hydrogen atoms, with the addition of hydrophilic starting components which ensure the solubility or dispersibility of the polyurethanes and optionally with the addition of the known additives used in polyurethane chemistry, characterized in that the compounds used as hydrophilic starting components are mono and/or diisocyanates containing structural units of the formula —O—X—R— and/or monofunctional and/or difunctional compounds containing isocyanate-reactive hydrogen atoms and containing structural units of the formula —O—X—R, wherein X and R have the meanings specified above, which hydrophilic starting components are used in such quantities that the polyurethane contains from about 0.5 to 20% by weight of ethylene oxide units attached through such groups in end positions and/or side positions and from about 0.1 to 25 milliequivalents of sulphonate groups —SO$_3^\ominus$ per 100 g, the aforesaid hydrophilic groups being present at a concentration sufficient to ensure the solubility or dispersibility of the polyurethanes.

DETAILED DESCRIPTION OF THE INVENTION

Suitable organic diisocyanates for the process according to the invention include, for example, those corresponding to the general formula Q(NCO)₂, in which Q represents an organic group such as can be obtained by removal of the isocyanate groups from an organic diisocyanate having a molecular weight within the range of from about 112 to 1000, preferably from about 140 to 400. Diisocyanates which are particularly suitable for the process according to the invention are those corresponding to the given general formula in which R represents a divalent aliphatic hydrocarbon group having from 4 to 18 carbon atoms, a divalent cycloaliphatic hydrocarbon group having from 5 to 15 carbon atoms, a divalent aromatic hydrocarbon group having from 6 to 15 carbon atoms or an araliphatic hydrocarbon group having from 7 to 15 carbon atoms. The following are typical examples of organic diisocyanates which are preferred for the process according to the invention: tetramethylene diisocyanate; hexamethylene diisocyanate; dodecamethylene diisocyanate; cyclohexane-1,3- and -1,4-diisocyanate; 1-isocyanato-3-isocyanato-methyl-3,5,5-trimethyl cyclohexane (isophorone diisocyanate); 4,4'-diisocyanato dicyclohexyl methane and aromatic diisocyanates such as 2,4-diisocyanato toluene, 2,6-diisocyanato toluene and mixtures of these isomers, 4,4'-diisocyanato diphenyl methane and 1,5-diisocyanato naphthalene.

The following are examples of compounds with molecular weights of from about 300 to 6000, preferably from about 500 to 3000, which contain isocyanate-reactive end groups and are difunctional in isocyanate polyaddition reactions:

1. dihydroxy polyesters known in polyurethane chemistry which are obtained from dicarboxylic acids such as succinic acid, adipic acid, suberic acid, azelaic acid, sebacic acid, phthalic acid, isophthalic acid, terephthalic acid, tetrahydrophilic acid, etc. and diols such as ethylene glycol, propylene glycol-(1,2), propylene glycol-(1,3), diethylene glycol, butane diol-(1,4), hexane diol-(1,6), octane diol-(1,8), neopentyl glycol, 2-methyl propane diol-(1,3) or the various isomeric bis-hydroxy methyl-cyclohexanes;

2. the polylactones known in polyurethane chemistry, e.g., the polymers of caprolactone started on the above-mentioned dihydric alcohols;

3. polycarbonates known in polyurethane chemistry, such as those obtained, for example, by reaction of the above-mentioned diols with diaryl carbonates or phosgene;

4. the polyethers known in polyurethane chemistry, e.g., the polymers and copolymers of styrene oxide, propylene oxide, tetrahydrofuran, butylene oxide or epichlorohydrin obtained using divalent starter molecules such as water, the above-mentioned diols or amines containing two NH-bonds. A certain proportion of ethylene oxide may also be included, provided that it does not amount to more than about 10% by weight of the polyether used, but polyethers which have been obtained without the addition of ethylene oxide should generally be used;

5. the polythioethers, polythio mixed ethers and polythio ether esters known in polyurethane chemistry;

6. the polyacetals known in polyurethane chemistry, for example, those obtained from the above-mentioned diols and formaldehyde; and 7. difunctional polyether esters containing isocyanate-reactive end groups.

The compounds preferably used for the process according to the invention are dihydroxy polyesters, dihydroxy polylactones, dihydroxy polyethers and dihydroxy polycarbonates.

The compounds according to the invention could, in principle, also be prepared without the aid of higher molecular polyhydroxyl compounds, i.e. exclusively from diisocyanates and low molecular weight reactants (molecular weight below about 300).

Examples of chain lengthening agents with molecular weights below about 300, preferably between about 60 and 300, which may be used in the process according to the invention for preparing self-dispersible polyurethanes include the low molecular weight diols already described for the preparation of the dihydroxy polyesters, and diamines such as diamino ethane, 1,6-diamino hexane, piperazine, 2,5-dimethyl piperazine, 1-amino-3-aminomethyl-3,5,5-trimethyl cyclohexane (isophorone diamine), 4,4'-diamino dicyclohexyl methane, 1,4-diamino cyclohexane and 1,2-propylene diamine as well as hydrazine, amino acid hydrazides, hydrazides of semicarbazido carboxylic acids, bis-hydrazides and bis-semicarbazides.

The diamine chain lengthening agents mentioned as examples may also be used in a blocked form for the process according to the invention, i.e. for example in the form of the corresponding bis-ketimines which are prepared by reaction of the amines with suitable ketones such as methyl ethyl ketone. For example, isocyanate prepolymers may be mixed in an anhydrous reaction mixture with blocked diamines which are unreactive with isocyanate groups, and the resulting mixture may then be mixed with water. The amino groups are thereby unblocked by hydrolysis so that the usual chain lengthening reaction can take place in the aqueous phase. It is particularly when such masked diamine chain lengthening agents are used that any higher than difunctional polyisocyanate which may have been added to compensate for the monofunctionality of, for example, monofunctional hydrophilic starting components may simply be mixed with the difunctional isocyanate prepolymer whereupon the resulting system which is approximately difunctional on statistical average, then undergoes a chain lengthening reaction.

In special cases, in which it is desired to obtain branched polyurethanes, a certain proportion of trifunctional and higher functional starting components known in polyurethane chemistry may be used in addition to the aforesaid starting components which are difunctional in isocyanate polyaddition reactions. Examples of such trifunctional and higher functional starting components are polyols such as trimethylol propane, glycerol, hexane triol-(1,2,6) and pentaerythritol as well as polyisocyanates containing at least three isocyanate groups such as tris-(isocyanatohexyl)-biuret, tris-(isocyanatohexyl)-isocyanurate or allophanate groups containing polyisocyanates. This addition of trifunctional and higher functional components is particularly advantageous when monofunctional hydrophilic polyethers are used, but the average functionality of the starting components should preferably not exceed about 2.1.

The hydrophilic starting components used in the process according to the invention may include any compounds containing isocyanate groups or isocyanate-reactive groups and, in both cases, also groups of the formula

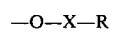

in which

R represents a hydrocarbon group having from 3 to 18 carbon atoms which contains at least one sulphonate anion —SO$_3^\ominus$ and which may also contain other, inert substituents such as alkoxy groups or halogen atoms and X represents a polyalkylene oxide-polyether chain having from 5 to 90, preferably from 15 to 70 chain members which consists to an extent of at least about 40%, preferably at least about 65% of ethylene oxide units and may in addition consist of styrene oxide, butylene oxide or, preferably, propylene oxide units.

Hydrophilic starting components containing groups of the above-mentioned structure which may be used in the process according to the invention include, in particular, mono- or diisocyanates having structural units of the formula given above and monohydric or dihydric alcohols having structural units of this formula.

The starting materials used for the preparation of the hydrophilic starting components generally include compounds corresponding to the formula

HO—R' in which R' represents an unsaturated, preferably mono-unsaturated, aliphatic hydrocarbon group having from 3 to 18, preferably from 3 to 6 carbon atoms, an unsaturated, preferably mono-unsaturated, cycloaliphatic or mixed cycloaliphatic/aliphatic hydrocarbon group having from 4 to 10 carbon atoms or, less preferably, an aromatic or araliphatic hydrocarbon group having a total of from 9 to 15 carbon atoms, which preferably contains an olefinically unsaturated, preferably mono-unsaturated, substituent in which the double bond is not conjugated with the aromatic ring.

Compounds in which the group R' carries inert substituents such as alkoxy groups or halogen atoms may, of course, also be used as starting materials for the preparation of the hydrophilic starting components.

The following are examples of suitable starting materials HO—R': allyl alcohol, 1-hydroxy-Δ2,3-hexene, 1-hydroxy-Δ3,4-hexene, 1-hydroxy-Δ9,10-octadecene, cyclohexen-3-ol, olefinically unsaturated bicyclic addition products of cyclopentadiene containing an alcoholic hydroxyl group, e.g. the compound corresponding to the following formula:

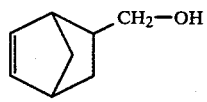

or p-allyl-benzyl alcohol or p-allyl-phenol.

Monohydric alcohols of the formula

HO—X—R which are already suitable as hydrophilic starting components can easily be obtained from the starting materials

HO—R' exemplified above by a simple, two-stage reaction.

In this reaction, the starting materials are alkoxylated in known manner, using ethylene oxide and optionally other alkylene oxides in accordance with the remarks made above with regard to the composition of the polyalkylene oxide polyether chain. In the second stage of the reaction, ammonium bisulphate or an alkali metal bisulphite is added chemically to the olefinic double bond of the monofunctional polyether alcohol obtained in the first stage. This addition of bisulphite is preferably carried out by reacting the unsaturated polyether alcohol with an aqueous solution of a pyrosulphite corresponding to the bisulphite under oxidizing conditions (access of air) at about 100° C. After acidification to a pH of about 2 to 3, excess sulphur dioxide is removed by a stream of air. Most of the water is then distilled off. Residues of water are removed using toluene as carrrier. The polyether alcohol corresponding to the formula

HO—X—R or its solution in toluene is left as residue. The inorganic salts formed may be removed by filtration.

The nature of the cation corresponds, of course, to that of the cation in the bisulphite or pyrosulphite. This nature of the cation is of minor importance for the subsequent reaction according to the invention. The salts used according to the invention are generally lithium, potassium, sodium or ammonium salts. Sodium and potassium salts are particularly preferred.

As already mentioned above, the compounds corresponding to the formula

HO—X—R are already suitable for use as hydrophilic starting components for the process according to the invention, but further modification of these compounds before they are used as hydrophilic starting components is often advisable.

Thus, for example, hydrophilic compounds of the formula

HO—X—R may be converted into the corresponding hydrophilic monoisocyanates of the formula

OCN—Q—NH—CO—O—X—R by reaction with diisocyanates of the formula

Q(NCO)$_2$ of the type exemplified above by a procedure analogous to that described in U.S. Pat. No. 3,905,929, incorporated herein by reference. These monoisocyanates are also suitable hydrophilic starting components for the process according to the invention.

However, these monoisocyanates may also be further reacted by the procedure according to U.S. Pat. No. 3,905,929 with dialkanolamines corresponding to the formula given in line 9, column 6 of U.S. Pat. No. 3,905,929, incorporated herein by reference, to produce glycols of the following formula which may be used as hydrophilic starting components according to the invention:

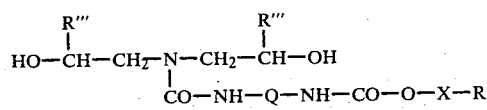

$$\begin{array}{c} \text{R}''' \quad\quad\quad \text{R}''' \\ | \quad\quad\quad\quad | \\ \text{HO—CH—CH}_2\text{—N—CH}_2\text{—CH—OH} \\ | \\ \text{CO—NH—Q—NH—CO—O—X—R} \end{array}$$

in which

Q, R and X have the meanings already specified and R''' preferably represents hydrogen or a methyl group.

The hydrophilic monohydric alcohols of the formula

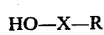

HO—X—R may also be reacted with diisocyanates Q(NCO)₂ according to the teaching of U.S. Pat. No. 3,920,598, incorporated herein by reference, to produce allophanate polyisocyanates of the formula

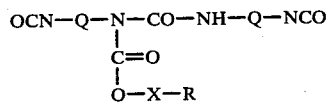

$$\begin{array}{c} \text{OCN—Q—N—CO—NH—Q—NCO} \\ | \\ \text{C=O} \\ | \\ \text{O—X—R} \end{array}$$

which may in turn be used as hydrophilic starting components in the process according to the invention.

When hydrophilic starting components which are monofunctional in the isocyanate addition reaction are used with exclusively difunctional starting components of the type exemplified above, the hydrophilic groups

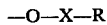

—O—X—R are preferably incorporated in end positions, whereas when difunctional hydrophilic starting components are used, the hydrophilic group is incorporated in side positions in the macromolecule.

The nature and quantity of the hydrophilic starting components exemplified above are preferably chosen so that the polyurethanes according to the invention contain from about 0.5 to 20% by weight, preferably from about 2 to 15% by weight, of ethylene oxide units within the polyether chain X and from about 0.1 to 25, preferably from about 0.4 to 20 milliequivalents of sulphonate ions —SO₃⁻ per 100 g of solids content. The total quantity of the aforesaid hydrophilic centers is chosen so that the products according to the invention will be soluble or dispersible in water. If the number of hydrophilic centers is small, dispersions ranging from coarse to fine are obtained, but, as the quantity of hydrophilic starting components increases within the ranges indicated above, solutions ranging from opaque to clear are obtained. The ratio of ethylene oxide units to sulphonate anions in the hydrophilic centers may vary within the wide ranges indicated above and can be adjusted, for example by suitable choice of the degree of alkoxylation when preparing the hydrophilic monohydric alcohols, by choice of the equivalent ratios of the individual alkylene oxides and by choice of the number of double bonds in the group R'.

The process according to the invention for the preparation of the self-dispersible polyurethanes may be carried out by the known methods of the single stage or two-stage process (prepolymer process) employed in polyurethane chemistry.

The reactants for preparing the self-dispersible polyurethanes may be used in an equivalent ratio of isocyanate groups to isocyanate-reactive groups of from about 0.8:1 to 2.5:1, preferably from about 0.95:1 to 1.5:1. The use of an isocyanate excess naturally results in compounds which contain isocyanate groups, and when these compounds are converted into an aqueous dispersion these isocyanate groups continue to react with water by a chain lengthening reaction to form the dispersed end product. The equivalent ratio given above, therefore, includes all of the components taking part in the synthesis of the polyurethanes according to the invention, including any amino group-containing chain lengthening agents used in the form of aqueous solutions, but not including that proportion of the water used for dispersal of the polyurethanes which may subsequently undergo a chain lengthening reaction with any isocyanate-containing compounds present.

Both the single stage process and the two-stage process may be carried out with or without solvents. Suitable solvents, particularly if, as described below, the polyurethanes are to be converted into an aqueous dispersion either during or after their formation include, for example, water-miscible solvents which are inert towards isocyanate groups and have a boiling point below about 100° C., e.g. acetone or methyl ethyl ketone.

In the one-stage process, the difunctional compounds with molecular weights from about 300 to 6000 mentioned under 1 to 7 above, which contain isocyanate-reactive groups, are preferably mixed with the hydrophilic components and any chain lengthening agents with molecular weights below about 300 used in the process. The resulting mixture is then added to the diisocyanate component in the absence of solvents, and the mixture is then reacted, preferably at temperatures of from about 50° to 150° C., optionally after addition of the known catalysts used in polyurethane chemistry. The quantity of diisocyanate components used in this method is chosen so that the NCO/OH ratio is in the range of from about 0.8 to 1.05. The viscosity of the reaction mixture rises during the reaction so that one of the above-mentioned solvents is gradually added to the mixture. An organic solution of the completely reacted polyurethane is finally obtained. The concentration of this solution is preferably adjusted to a solids content of from about 10 to 70% by weight, in particular from about 15 to 55% by weight.

Conversion of the dissolved polyurethane elastomers into an aqueous dispersion is then suitably carried out by the addition of water to the stirred solution. In many cases, the solution then passes through the phase of a water-in-oil emulsion which then converts into an oil-in-water emulsion when it overcomes a viscosity maximum. A purely aqueous stable dispersion is left after removal of the solvent by distillation.

In the two-stage process, an isocyanate prepolymer is preferably first prepared solvent-free from excess diisocyanate, higher molecular weight, difunctional compounds of the type exemplified under 1 to 7 above containing isocyanate-reactive groups and hydrophilic components maintaining an NCO/OH ratio of from about 1.1:1 to 3.5:1, preferably from 1.2:1 to 2.5:1. Solvent may already be present during the preparation of this isocyanate prepolymer, but if no solvent is used at this stage, the prepolymer may then be taken up, for example, in a suitable solvent. The resulting solution of prepolymer may then be reacted in known manner with the chain lengthening agent having a molecular weight below about 300, of the type exemplified above.

One particular variation of the two-stage process is recommended for preparing the polyurethane dispersions according to the invention. In this variation of the process, a solution of the chain lengthening agent (preferably the aforesaid diamines or hydrazine derivatives) in small quantities of water or a water/solvent mixture is added to the above-described solution of the isocyanate prepolymer in the quantity required to obtain an NCO/NH ratio of from about 2.5 to 1.05. This reaction may be carried out at room temperature or preferably at about 25° to 60° C. The polyurethane dispersion is finally obtained by addition of the remainder of the water followed by removal of the solvent. In this variation of the process, however, the chain lengthening agent may also be dissolved in the total quantity of water present in the dispersion (from about 50 to 200% by weight, based on solid polyurethane).

The two-stage process described above may quite easily also be carried out solvent-free by first preparing the isocyanate prepolymer described above under solvent-free conditions and stirring it into the water which may contain the above-mentioned amino group-containing chain lengthening agents as aqueous solutions.

If the polyurethanes are to contain monofunctional hydrophilic polyethers in end positions, it is advisable to provide for at least slight branching of the products, for example, by the addition of a certain proportion of trifunctional or higher functional starting components or by partial allophanatization, trimerization or biuretization, but the average functionality of the starting components should preferably not exceed about 2.1. The resulting polyurethane obtained as solvent-free melt or as solution may be converted into an aqueous dispersion by mixing it with water and then distilling off any auxiliary solvent used.

The polyurethanes according to the invention may, in principle, be converted into aqueous dispersions by any known process. As examples may be mentioned the method of dispersion without the use of solvents, e.g. by mixing the solvent-free polyurethane with water in apparatus which are capable of producing high shear gradients or the use of very small quantities of solvents to plasticize polyurethanes when using the same apparatus, or the aid of non-mechanical dispersing agents such as ultra-high frequency sound waves. Lastly, in the case of polyurethane ureas, chain lengthening may be carried out after conversion of the prepolymer into an aqueous emulsion. Simple mixers such as stirrer vessels or so-called continuous flow mixers may also be used since the polyurethanes according to the invention are self-dispersible.

The dispersions may be blended with other anionic or non-ionic dispersions, e.g. with dispersions of polyvinyl acetate, polyethylene, polystyrene, polybutadiene, polyvinyl chloride, polyacrylate or copolymer resin dispersions. Known ionic emulsifiers which are preferably not chemically fixed may also be added although they are, of course, not required.

Fillers, plasticizers, pigments, carbon black and silicate sols, and dispersions of aluminum, clay or asbestos may also be incorporated in the dispersions.

The dispersions of the polyurethanes in water are in most cases stable in transport and storage and may be processed at any later date, for example to shape them. They generally dry immediately to form dimensionally stable coatings, but they may also be shaped in the presence of known cross-linking agents. The polyurethanes obtained vary in their properties according to the selected chemical composition and the urethane group content. Soft, sticky masses and thermoplastic or rubbery elastic products having various degrees of hardness up to glass hard duroplasts can be obtained. The hydrophilic character of the products may also vary within certain limits. Elastic products can be thermoplastically processed at elevated temperatures, for example at about 100°–180° C., provided they are not chemically cross-linked.

The products of the process are suitable for coating and impregnating woven and non-woven textiles, leather, paper, wood, metals, ceramics, stone, concrete, bitumen, hard fiber, straw, glass, porcelain, various types of synthetic resin and glass fibers to render them anti-static and crease-resistant; as binders for non-woven webs; as adhesives, bonding agents, laminating agents; agents to render products hydrophobic; plasticizers, and binders, e.g. for cork powder or sawdust, glass fibers, asbestos, paper or similar materials, plastics or rubber waste and ceramic materials; as auxiliary agents in cloth printing and in the paper industry; as additives to polymers; as sizes, for example for glass fibers, and for leather finishing.

The dispersions or pastes are preferably applied to a porous substrate which subsequently remains bonded to the finished product, e.g. to woven or non-woven textiles or fiber mats, felts, or fleeces or paper fleeces, foam plastics foils or split leather, which effect instant solidification of the coating by virtue of their absorbency. The products are subsequently dried at elevated temperatures and, if necessary, are pressed. Drying may be carried out on smooth, porous or non-porous materials such as metal, glass, paper, cardboard, ceramic materials, sheet steel, silicone rubber or aluminum foil. The finished sheeting is subsequently stripped off and used as such or applied to a substrate by glueing, flame laminating or calendering, using the reversal process. Such application by the reversal process may be carried out at any time later.

The properties of the products obtained from the process may be modified by the addition of vinyl polymers or active or inactive fillers such as, for example, polyethylene, polypropylene, polyvinyl acetate, ethylenevinyl acetate copolymers which may be (partly) saponified and/or grafted with vinyl chloride; styrene-butadiene copolymers, ethylene (graft) copolymers, polyacrylates, carbon black, silicates, asbestos, talcum, kaolin, titanium dioxide, glass in the form of powder or fibers, or cellulose. The end product may contain up to about 70% of such fillers, based on the total quantity of dry substance, depending on the properties required of the end products and purpose for which they are to be used.

Dyes, pigments, plasticizers or additives which influence the flow properties may, of course, also be added.

The products obtained by the various techniques of application may be dried at room temperature or elevated temperatures. The drying temperature to be chosen in any particular case, which depends mainly on the moisture content, drying time and thickness of the layer apart from the chemical composition, is easily determined by a preliminary test. Whatever the heating time, the drying temperature must always be below the solidification temperature.

The sheetings obtained may subsequently be treated with a finish to increase the resistance of their surface. Aqueous dispersions or solutions are preferably used for this purpose.

Very hard polyurethanes obtained from finely divided dispersions and sols are suitable for use as stoving lacquers and in some cases even as air-drying lacquers. They combine great hardness and elasticity with high gloss and, when used with aliphatic diisocyanates, also high light fastness and resistance to weathering.

The composition, preparation and some physical properties of these novel polyurethanes are described in the following Examples.

The percentages given in the Examples refer to percentages by weight unless otherwise specified.

EXAMPLES

Example 1

1000 g of a polyether of ethylene oxide and propylene oxide (molar ratio 85:15) with hydroxyl number 56.2 which has been started on allyl alcohol and 190 g of sodium pyrosulphite ($Na_2S_2O_5$) are dissolved in 200 g of water. A finely divided stream of air is passed through while the solution is stirred at 100° C. for 24 hours. The solution is then cooled to room temperature and acidified to pH 2.0 with 50% sulphuric acid. Air then continues to be passed through the solution with vigorous stirring for a further 10 hours, until the bulk of excess sulphur dioxide has been removed. The pH is then adjusted to 6.0 with a 20% sodium hydroxide solution. The water is distilled off under vacuum and when most of it has been removed, 500 g of toluene are added and the remainder of the water is distilled off as an azeotropic mixture with toluene. The product left behind is filtered under pressure to remove the organic salts formed.

The resulting polyether monoalcohol containing sulphonate groups is yellowish and has a viscosity of about 5000 mPas (20° C.). Its analytically determined sulphur content is 3.0%. The sulphonate group content ($-SO_3^\ominus$) is calculated to be 7.3% and the content in polyethylene oxide segments to be 69%.

Example 2

A polyether monohydric alcohol containing sulphonate groups is prepared from the following starting materials by the method described in Example 1:

855 g of a polyether of ethylene oxide started on allyl alcohol (hydroxyl number 65.5),
190 g of $Na_2S_2O_5$ and
2000 g of water.

The residue left after removal of the water by distillation is diluted with 300 g of toluene to reduce its viscosity before it is filtered under pressure. Removal of the toluene by distillation leaves a pale yellow, highly viscous product which slowly crystallizes at room temperature. Its analytically determined sulphur content is 3.5%. The content in sulphonate groups ($-SO_3^\ominus$) is calculated to be 8.3% and the content in polyethylene oxide segments to be 83%.

Example 3

Reaction mixture 729 g of a polyester of adipic acid and butane diol (molecular weight 900),
154 g of a polyether monohydric alcohol containing sulphonate groups, prepared according to Example 1,
10.7 g of trimethylol propane,
399.6 g of isophorone diisocyanate,
2000 g of acetone,
119 g of isophorone diamine,
10 g of hydrazine hydrate and
2130 g of deionized water.

Method

The sulphonate-polyether monohydric alcohol and trimethylol propane are added to the polyester which has been dehydrated at 100° C. under vacuum. Isophorone diisocyanate is then added and the mixture is stirred at 90° C. until its isocyanate content is 5.2%. After cooling to 50° to 60°0 C., the prepolymer is dissolved by the addition of acetone. It is then further cooled to room temperature and isophorone diamine followed by hydrazine hydrate are added dropwise with vigorous stirring. After 5 minutes, the reaction mixture is dispersed by stirring water into it. The acetone is then removed by vacuum distillation, leaving behind a finely divided dispersion which has a solids content of 40% and a Ford cup viscosity (4 mm nozzle) of 18 seconds. The dispersion shows a Tyndall effect in transmitted light.

The solids component of the dispersion contains 7.5% of polyethylene oxide segments and 9.9 milliequivalents of sulphonate groups ($-SO_3^\ominus$) per 100 g of solids component.

Example 4

Reaction mixture 967.5 g of a polyester of adipic acid and butane diol (molecular weight 2250),
225 g of a polypropylene oxide-polyether started on bisphenol A (molecular weight 550),
154 g of sulphonate group-containing polyether monohydric alcohol prepared according to Example 1,
133.2 g of isophorone diisocyanate,
285.6 g of hexamethylene-1,6-diisocyanate,
37.4 g of a biuret polyisocyanate obtained from 2 mol of hexamethylene diisocyanate and 1 mol of water,
222.4 g of bis-ketimine obtained from isophorone diamine and methyl ethyl ketone,
12.5 g of hydrazine hydrate and
2770 g of deionized water.

Method

A mixture of isophorone diisocyanate and hexamethylene diisocyanate is added at 70° C. to the mixture of polyester, polyether and sulphonate-polyether monohydric alcohol which has been dehydrated under vacuum at 100° C. The resulting mixture is then stirred at 80°-90° C. until it has an isocyanate content of 6.2%. The prepolymer obtained is cooled to 60° C. and the biuret polyisocyanate is added, followed by the bis-ketimine. Water preheated to 50° C. in which the hydrazine hydrate has been dissolved is then added with vigorous stirring. A finely divided dispersion having solids content of 40% and a Ford cup viscosity (4 mm nozzle) of 14 seconds is formed. The dispersion shows a Tyndall effect in transmitted light.

The solids component of the dispersion contains 5.5% of polyethylene oxide segments and 7.3 milliequivalents of sulphonate groups ($-SO_3^\ominus$) per 100 g of solids component.

Example 5

Reaction mixture 1012.5 g of a polyester of adipic acid and butane diol (molecular weight 2250),
247.5 g of a polypropylene oxide polyether started on bisphenol A (molecular weight 550),
192 g of a sulphonate group-containing polyether monohydric alcohol prepared according to Example 2,
177.6 g of isophorone diisocyanate,
243.6 g of hexamethylene-1,6-diisocyanate,
55.8 g of biuret polyisocyanate obtained from 3 mol of hexamethylene diisocyanate and 1 mol of water,
175 g of a bis-ketimine obtained from isophorone diamine and acetone,
15 g of hydrazine hydrate and
2980 g of deionized water.

Method

A prepolymer (NCO=5.6%) is prepared as described in Example 4 from the polyester, polyether, sulphonate polyether and the two diisocyanates. The prepolymer is cooled to 60° C. and the biuret polyisocyanate and bis-ketimine are added one after the other. Water preheated to 50° C. in which the hydrazine hydrate has been dissolved is added to this mixture with vigorous stirring. A finely divided dispersion having a solids content of 40% and a Ford cup viscosity (4 mm nozzle) of 15 seconds is obtained. The dispersion shows a Tyndall effect in transmitted light. The solids component of the dispersion contains 7.8% of polyethylene oxide segments and 9.8 milliequivalents of sulphonate groups ($-SO_2^\ominus$) per 100 g of solid component.

Example 6

1564 parts of a polyester diol of hexane-1,6-diol, 2,2-dimethylpropane-1,3-diol and adipic acid with OH number 63 is dehydrated under a vacuum of about 14 Torr at 100° C. After the addition of 110 parts of an adduct of (i) 1 mol of the monohydroxy polyether according to Example 1 (hydroxyl number 40.7), (ii) one mol of hexane-1,6-diisocyanate and (iii) one mol of diethanolamine, there is added a mixture of 244.2 parts of 3-isocyanatomethyl-3,5,5-trimethyl cyclohexyl isocyanate and 185 parts of hexane-1,6-diisocyanate. The mixture is stirred at 100° C. until it has an isocyanate content of 4.7%. When the mixture has cooled to 50° to 60° C., 3100 parts of anhydrous acetone are added. A mixture of 119 parts of 3-aminomethyl-3,5,5-trimethyl-cyclohexylamine and 10 parts of hydrazine monohydrate dissolved in 250 parts of water is slowly stirred into this acetonic solution. Stirring is continued for a further 10 minutes and 1980 parts of deionized water are then added with vigorous stirring. A bluish-white dispersion of the solids component in a mixture of water and acetone forms. After removal of the acetone by distillation, an aqueous dispersion of the solids component is obtained at a concentration of 50%. The solids component of the dispersion contains 2.72% of polyethylene oxide segments and 3.28 milliequivalents of sulphonate groups ($-SO_3^\ominus$) per 100 g of solids component.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. Polyurethane elastomers which are soluble or dispersible in water and have a substantially linear molecular structure and contain both ethylene oxide units built into polyether chains and sulphonate groups, characterized in that they contain from about 0.5–20% by weight of ethylene oxide units of the formula $-CH_2-CH_2-O-$ arranged within polyether chains and from about 0.1–25 milliequivalents per 100 g of solids content of sulphonate groups of the formula $-SO_3^\ominus$ in the form of structural units corresponding to the following formula arranged in end positions and/or side chains:

$$-O-X-R$$

wherein
X represents a polyalkylene oxide chain having from 5–90 chain members, at least about 40% of which chain members are ethylene oxide units, and
R represents a monovalent hydrocarbon group having from 3–18 carbon atoms and containing at least one sulphonate group $-SO_3^\ominus$.

2. A process for the preparation of polyurethanes which are soluble or dispersible in water according to claim 1 by the reaction of organic diisocyanates with organic compounds having molecular weights of from about 300 to 6000 which are difunctional in isocyanate polyaddition reactions and contain isocyanate-reactive hydrogen atoms in end positions and/or low molecular weight compounds, with molecular weights below about 300, having at least two isocyanate-reactive hydrogen atoms, with the addition of hydrophilic starting components which ensure the solubility or dispersibility of the polyurethanes, characterized in that the hydrophilic starting components used comprise a member selected from the group consisting of monoisocyanates, diisocyanates, compounds having one isocyanate-reactive group and compounds having two isocyanate-reactive groups, said hydrophilic starting components having structural units of the formula $-O-X-R$ within the meaning indicated in claim 1, which hydrophilic starting components are used in such quantities that the polyurethane contain from about 0.5 to 20% by weight of ethylene oxide units attached through such groups in end positions and/or side chains and from about 0.1 to 25 milliequivalents per 100 g of solids content of sulphonate groups $-SO_3^\ominus$, the total quantity of the aforesaid hydrophilic groups being present at a concentration which ensures the solubility or dispersibility of the polyurethanes.

3. A water-dispersible or water-soluble polyurethane containing structural units in end positions or side chains of the formula $$-O-X-R$$

wherein
X represents a polyalkylene oxide chain having from 5 to 90 chain members, at least about 40% of which are ethylene oxide units of the formula $-CH_2-CH_2-O-$, and
R represents a monovalent hydrocarbon group having from 3 to 18 carbon atoms and containing at least one sulfonate ion of the formula $-SO_3^\ominus$
in a sufficient quantity to contribute about 0.5 to 20% by weight of ethylene oxide units, based on the weight of the polyurethane, to the polyurethane and about 0.1 to 25 milliequivalents of sulphonate ions per 100 g of polyurethane to the polyurethane.

4. The polyurethane of claim 3 wherein
X represents a polyalkylene oxide chain having from 15 to 70 chain members, at least about 65% of which are ethylene oxide units.

5. The polyurethane of claim 3 wherein the structural unit —O—X—R is present in a sufficient quantity to contribute about 2 to 15% by weight of ethylene oxide units, based on the weight of the polyurethane, to the polyurethane and about 0.4 to 20 milliequivalents of sulfonate ions per 100 g of polyurethane to the polyurethane.

6. A process for the preparation of a water-dispersible or water-soluble polyurethane comprising reacting
(a) an organic diisocyanate having a molecular weight between about 112 and 1000,
(b) an organic compound having a molecular weight of between about 60 and 6000 and having at least two isocyanate-reactive end groups, and
(c) a hydrophilic compound responsible for the dispersibility or solubility of the resulting polyurethane comprising a member selected from the group consisting of monoisocyanates, diisocyanates, compounds having at least one isocyanate-reactive group and compounds having at least two isocyanate-reactive groups, said hydrophilic compound having structural units of the formula

—O—X—R wherein
X represents a polyalkylene oxide chain having from 5 to 90 chain members, at least about 40% of which are ethylene oxide units, and
R represents a monovalent hydrocarbon group having from 3 to 18 carbon atoms and containing at least one sulphonate —SO$_3^\ominus$ group
which are present in a sufficient quantity to contribute to the resulting polyurethane about 0.5 to 20% by weight of ethylene oxide units, based on the weight of the resulting polyurethane, and about 0.1 to 25 milliequivalents of sulfonate ions per 100 g of resulting polyurethane, said hydrophilic groups being attached to the resulting polyurethane in end positions or side chains.

7. The process of claim 6 wherein the equivalent ratio of isocyanate groups to isocyanate-reactive groups is from about 0.8:1 to 25:1.

8. The process of claim 6 wherein the organic compound having at least two isocyanate-reactive end groups has a molecular weight between about 300 and 6000.

9. The process of claim 6 wherein the organic compound having at least two isocyanate-reactive end groups has a molecular weight between about 60 and 300.

* * * * *